United States Patent [19]

Sule

[11] Patent Number: 5,082,093
[45] Date of Patent: Jan. 21, 1992

[54] HYDRAULIC BICYCLE BRAKE

[75] Inventor: Sandor Sule, Thayngen, Switzerland

[73] Assignee: Pellyfren AG, Flurlingen, Switzerland

[21] Appl. No.: 628,157

[22] Filed: Dec. 17, 1990

[30] Foreign Application Priority Data

Sep. 17, 1990 [DE] Fed. Rep. of Germany ....... 4029401

[51] Int. Cl.⁵ .............................................. B62L 3/06
[52] U.S. Cl. ............................... 188/24.22; 188/344
[58] Field of Search ................. 188/344, 24.22, 72.4, 188/72.5, 72.6, 24.11; 92/169.1, 161, 161.5, 146

[56] References Cited

U.S. PATENT DOCUMENTS

| | | | |
|---|---|---|---|
| 4,175,648 | 11/1979 | Sule | 188/344 |
| 4,615,415 | 10/1986 | Mathauser | 188/344 X |
| 4,632,225 | 12/1986 | Mathauser | 188/344 X |
| 4,896,753 | 1/1990 | Sule | 188/344 |

Primary Examiner—Matthew C. Graham
Assistant Examiner—Peter M. Poon
Attorney, Agent, or Firm—Bachman & LaPointe

[57] ABSTRACT

A hydraulic bicycle brake comprises at least one actuating cylinder and at least one brake cylinder in a cylinder mounting, the brake cylinder being connected to the actuating cylinder by a fluid line, wherein the fluid line opens into a variable-volume chamber in the brake cylinder and the movement of a brake element, for example a brake shoe, is controllable by the variation in volume thereof, characterized in that the brake cylinder rests in the mounting eye of a rotatable mounting element and the latter can be fixed in a preselectible position.

16 Claims, 2 Drawing Sheets

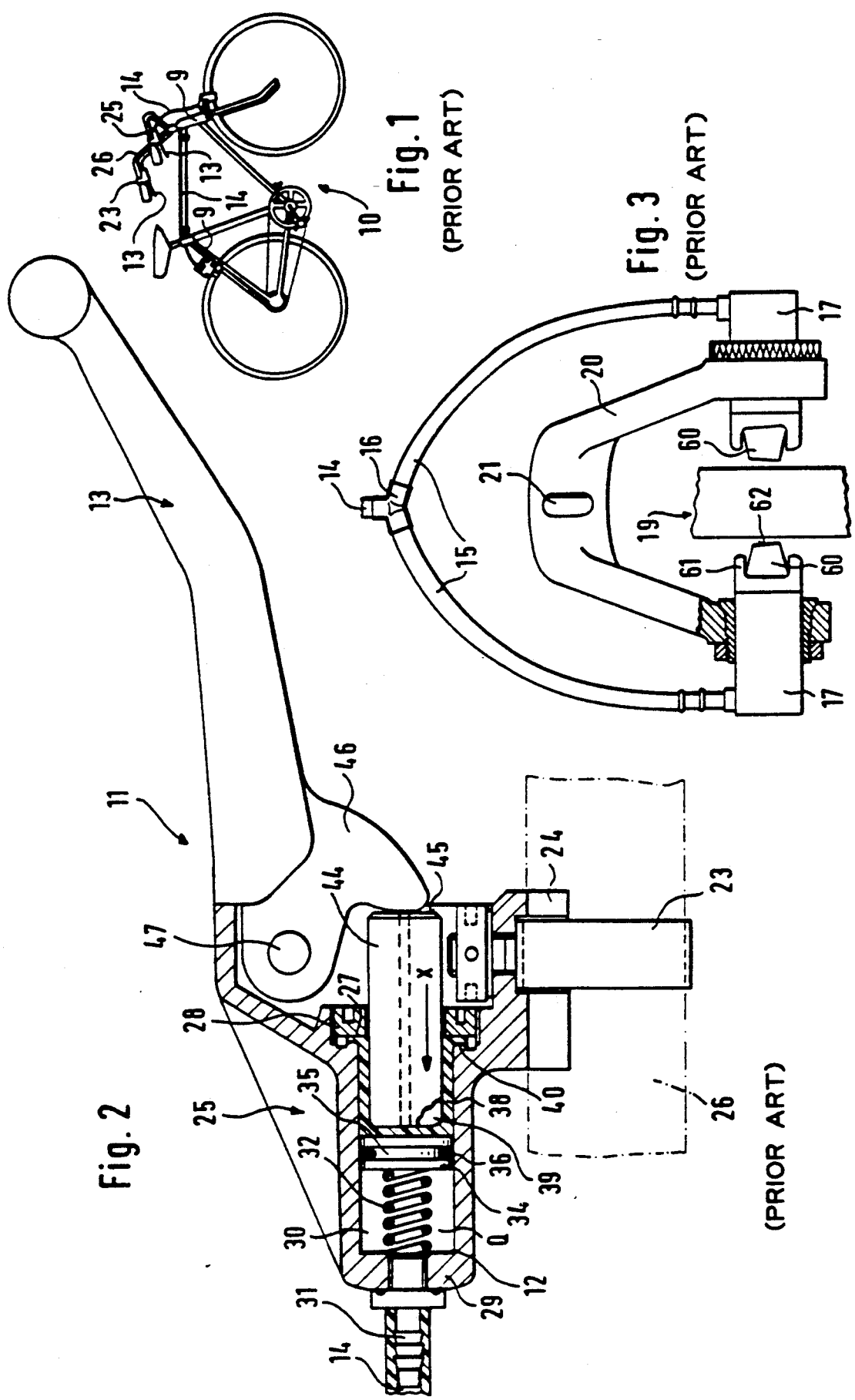

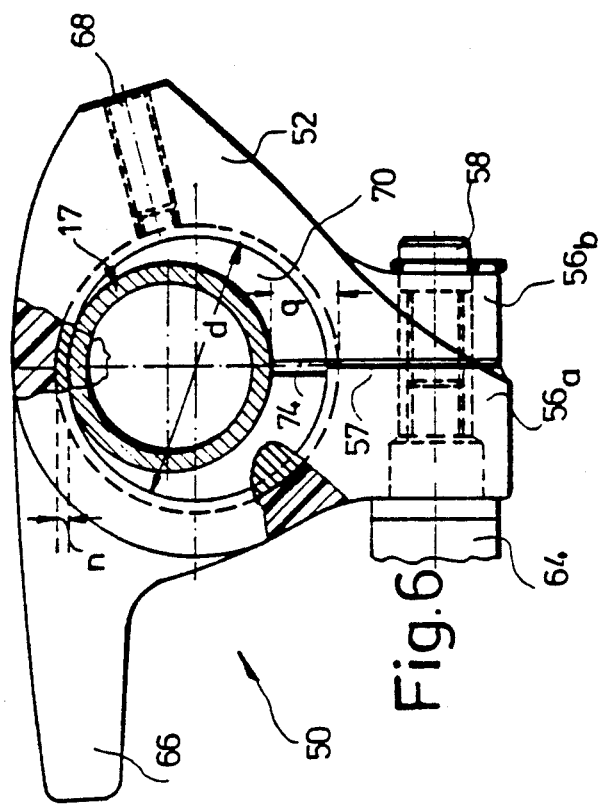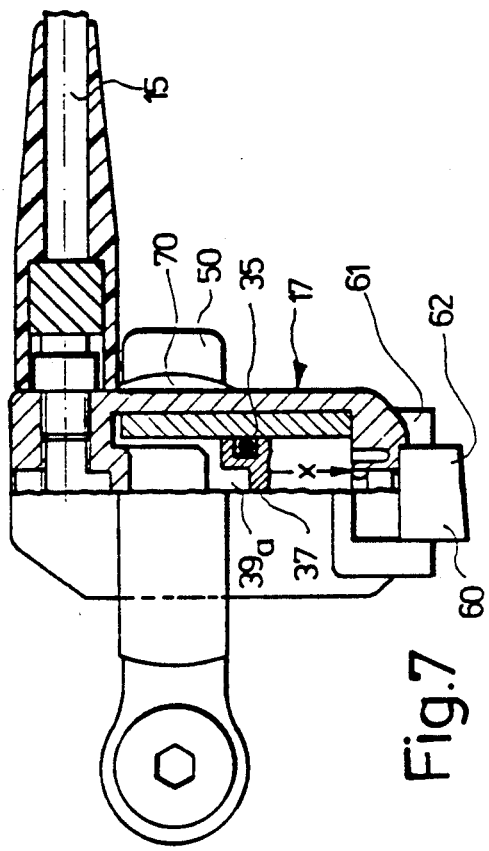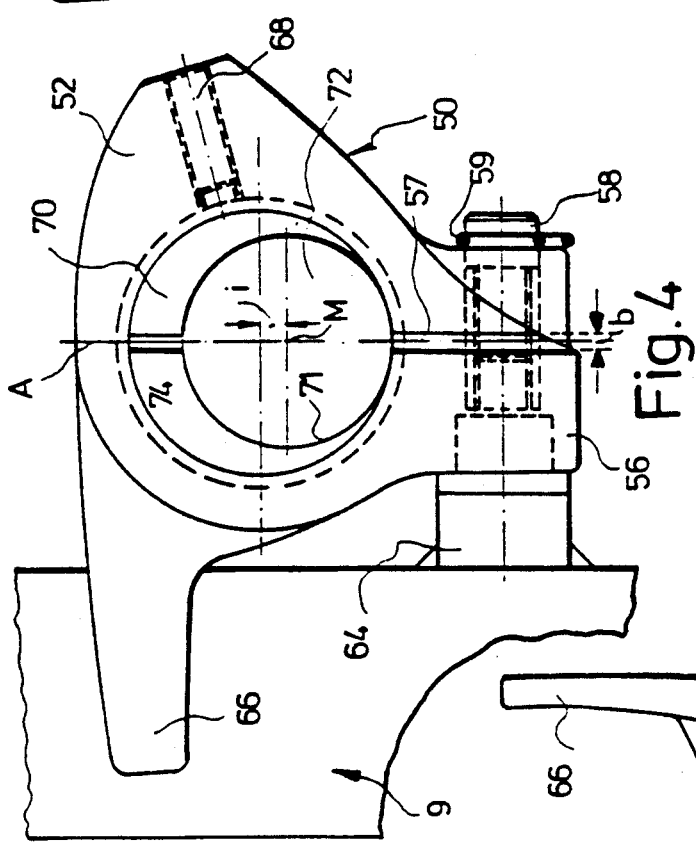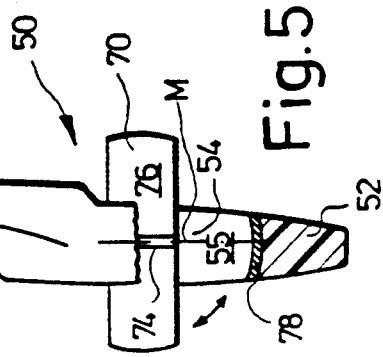

HYDRAULIC BICYCLE BRAKE

BACKGROUND OF THE INVENTION

The invention relates to a hydraulic bicycle brake comprising at least one actuating cylinder and at least one brake cylinder in a cylinder mounting, the brake cylinder being connected to the actuating cylinder by a fluid line, wherein the fluid line opens into a variable-volume chamber in the brake cylinder and the movement of a brak element, for example a brake shoe, is controllable by the variation in volume thereof.

A hydraulic bicycle brake of that kind is to be found in German laid-open application (DE-OS) No 37 12 734 describing a hydraulic system which is closed in itself, consisting of an actuating cylinder and a brake cylinder. It has been found in practice that very accurate adjustment of the brake cylinders in relation to the wheel coming into contact therewith is required, for which reason the inventor set himself the aim of improving the mounting of the brake cylinder in the proximity of the wheel.

SUMMARY OF THE INVENTION

That object is achieved in that the brake cylinder rests in the mounting eye of a rotatable mounting element and the latter can be fixed in a preselectable position.

In that arrangement it has been found advantageous for the mounting element to be in the form of a mounting ring disposed in an opening in a holding body associated with a wheel of the bicycle.

In accordance with a further feature of the invention the mounting eye is arranged eccentricaly in the mounting ring and the latter has different wall thicknesses on at least one diameter. That results in the mounting ring being of a shape which is partly half moon-like in plan view while in a particular configuration according to the invention the outside surface of the mounting ring is curved in cross-section and therefore forms a part of a spherical surface.

The inside surface of the opneing in the holding ring is also of such a configuration as to match the above-mentioned outside surface, that is to say it is concave in cross-section.

The mounting ring with its eccentric mounting eye can thus be turned and set as desired relative to the holding body, without falling out of the opneing in the holding body. By virtue of a further essential feature, namely a radial gap in the mounting ring, the diameter thereof can also be reduced to a limited degree by the mounting ring being pressed together, which permits additional adaptation to the size of the brake cylinder to be used.

The diameter of the mounting ring can be varied in as imple manner by the clamping body as the latter also has a slit at one side of the opening therein and forms clamping jaws on both sides of the slit, which jaws are adjustable by means of a screw element or the like in respect of the distance therebetween, thereby varying the width of the slit.

The described and claimed configuratino fo the cylinder mounting arrangement is primarily intended for bicycles but it can also be used in relation to other brake holding arrangements in accordance with the invention.

BRIEF DESCRIPTION OF THE DRAWINGS

Further advantages, features and details of the invention will be apparent from the following description of preferred embodiments and with reference to the drawings in which:

FIG. 1 is a side view of a bicycle with a bicycle brake including a brake cylinder, FIG. 2 is a view partly in longitudinal section of a detail of the bicycle brake, on a larger scale than FIG. 1.

FIG. 3 is a partly sectional view of the arrangement of the brake cylinder on the bicycle, FIG. 4 is a side view of a brake cylinder mounting arrnagement, FIG. 5 is a sectional plan view of the brake cylinder mounting arrngement, with the parts thereof associated in a different fashion, FIG. 6 is a side view of the brake cylinder holding arrangement in a different operating position from that shown in FIG. 4, and FIG. 7 is a partly sectional plan view of a brake cylinder in its mounting arrangement.

DETAILED DESCRIPTION

A bicycle brake system 11 for a bicycle 10 which is shown in diagrammatic form in FIG. 1 comprises an actuating cylinder 12 with hand lever 13, a brake line 14 extending from the actuating cylinder 12 and a pair of brake cylinders 17 on both sides of a wheel 19 of a two-wheeled vehicle which is not shown in FIGS. 2 through 7.

The brake cylinders 17 are attached to a part 21 of a wheel fork 9 or the like in FIG. 3 by means of a fork-like holding arrangement 20 and connected to the brake line 14 by way of line bends 15 and a T piece 16.

The actuating cylinder 12 is fixedly arried on a handlebar 26 with the interposition of a clamping clp 23, by means of a base portion 24 of its cylinder housing 25, and, as shown in FIG. 2, has a cylindrical pressure chamber 30 in which a coil spring 32 at one end bears against an end wall 29 of the chamber while at the other end it is in contact with a disc piston 34. The piston 34 accommodates an O-ring 36 in its peripheral groove 35 and by way of its end remote from its coil spring 32 bears snugly against a cup-like plastic insert 38 of resilient material which is fixed in position by a radial flange-like portion 40 between an annular shoulder 27 of the cylinder housing 25 and a clamping ring 28.

Disposed in the annular space 39 in the resilient plastic insert 38 is a pressure pin 44, the free end 45 of which is engaged by a projection 46 of the hand lever 13 which is mounted rotatably at a pin or bolt 47. Upon actuation of the hand lever 13 the pressure pin 44 and therewtih also the piston 34 are pushed in the pressure direction x. By virtue of the cup-like resilient plastic insert 38, the brake flud Q in the pressure chamber 30 is expelled into the hose-type brake line 14 in a leakage-free manner.

The brake cylinder 17 approximately corresponds in terms of its structure to the actuating cylinder 12 and for example is also provided with a cup-like plastic insert.

The brake fluid Q in the pressure chamber, upon actuation of the actuating cylinder 12, presses a brake shoe 60 against a rim which is indicated at 19. The brake shoe 60 has side tongue portions 61 of a housing member engaging thereover on both sides thereof and is provided with a brake surface 62 which is inclined with respect to the axis of the cylinder. As shown in FIG. 3 the brake surfaces 62 of two brake shoes 60 are disposed in mutually opposite relationship.

Each of the brake cylinders 17 is provided in a cylinder mounting 50 which is carried on the wheel fork indicated at 9 in FIGS. 4 through 6, and has a flat clamping body 52 with a circular opening 54 extending therethrough. The clamping body 52 which is approximately triangular in side view as shown in FIGS. 4 and 6 is slitted in the region of a holding limb portion 56 which is formed thereon, downwards from the opening 54 through the clamping body in the position of installation shown in FIGS. 4 and 6; the slit 57 sepates two parts 56a and 56b of the holding limb portion 56; the width b of the slit 57 can be reduced in dependence on the tightening position of a screw 58 which passes through the two parts 56a and 56b, when the assembly is transferred from the rest position shown in FIG. 4 into a tightening position as shown in FIG. 6. The screw 58 bears against the outer part 56b of the holding limb portion 56, with the interposition of an annular spring 59 of spring steel, while at the other end it is fitted into a screw opening in a screw bush 64 on the wheel fork 9.

Disposed above the screw bush 64 is a fin-like shaped portion 66 of the clamping body 52; when the cylinder mounting 50 moves, the portion 66 bears against the wheel fork 9.

In opposite relationship to the fin portion 66, a screwthreaded pin 68 passes through the clamping body 52 in a direction which is substantially radial with respect to the opening 54 through the clamping body. A mounting ring 70 which rests in the opening 54 in the clamping body 52 can be clamped fast therein by the screwthreaded pin 68.

The mounting ring 70 accommodates the brake cylinder 17 in a mounting eye 72 which is delimited by a cylindrical inside surface 71. The mounting eye 72 is arranged in the mounting ring 70 in eccentric relationship at a spacing i relative to the center line M of the mounting ring 70 so that the mounting ring 70 is an almost half moon-like outline with a greatest width q and a least width n (see FIG. 6). An axis A of the mounting ring 70 is the axis of symmetry.

At its greatest width q the mounting ring 70 has a radial gap 74 which is preferably disposed on the axis A. The width d of the ey can be reduced by virtue of the radial gap 74 by actuation of the screw 58 and a reduction in the width b of the slit, so that it can be pressed firmly against the brake cylinder 17.

The outside surface 76 of the mounting ring 70 is spherically curved in cross-section, that is to say, it is a ring-like portion from a surface of a sphere of a diameter d. The inside surface 55 of the opening 54 in the clamping body is in the form of acounterpart surface which can bear closely hereagainst, that is to say, it is also curved spherically in cross-section. If the cylinder mounting 50 comprises metal, the inside surface 55 can be integral with the cylinder mounting 50. In the case of a cylinder mounting 50 of plastic material, it is recommended that the arrangement uses a separate seat insert 78 which is in turn of a ring-like configuration (see FIG. 5).

When the screw 58 is loosened, the mounting ring 70 rests rotatably in the seat insert 78 or the cylinder mounting 50, as indicated in FIG. 5. That makes it readily possible to adjust a pushed-in brake cylinder 17 about the center line M.

The entire brake system described is leak-free as the brake fluid Q is also unable to escape accidentally in the brake cylinders 17. At the brake cylinder 17 the fluid fills an internal chamber 39a in the plastic insert, the end wall 37 of which is urged in the direciton x by the brake fluid Q.

When that happens the brake shoe 60 is pushed out. When the pressure of the brake fluid Q is reduced, the brake shoe 60 is returned again by a coil spring.

I claim:

1. A hydralic bicycle brake cylinder comprising at least one actuating cylinder, at least one brake cylinder in a cylinder mounting, and a brake element operatively connected to the brake cylinder, the brake cylinder being connected to the actuating cylinder by a fluid line, wherein the fluid line opens into a variable-volume chamber in the brake cylinder and the movement of the brake element is controllable by the variation of volume thereof, wherein the brake cylinder rests in a mounting eye of a rotatable mounting ring which is fixable in a preselectable position and wherein the mounting eye is arranged eccentrically in the mounting ring.

2. A bicycle brake according to claim 1 wherien the brak eelement is a brake shoe.

3. A bicycle brake according to claim 1 wherein the mounting ring is provided in an opening in a holding body associated with a wheel of the bicycle.

4. A bicycle brake according to claim 1 wherein the mounting ring has different wall thicknesses on at least one diameter.

5. A bicycle brake according to claim 1 wherein the outside surface of the mounting ring is curved in cross-section.

6. A bicycle brake according to claim 1 wherein the outside surface of the mounting ring is part of a spherical surface.

7. A bicycle brake according to claim 1 wherein the mounting-ring has a radial gap.

8. A bicycle brake according to claim 2 wherein the radial gap extends through the region of largest wall thickness of the mounting ring.

9. A hydraulic bicycle brake cylinder comprising at least one actuating cylinder, at least one brake cylinder in a cylinder mounting, and a brake element operatively connected to the brake cylinder, the brake cylinder being connected to the actuating cylinder by a fluid line, wherein the fluid line opens into a variable-volume chamber in the brake cylinder and the movement of the brake element is controllable by the variation of volume thereof, wherein the brake cylinder rests in a mounting eye of a rotatable mounting ring which is fixable in a preselectible position and wherein the mounting ring in plan view is at least partly of half moon-like configuration.

10. A hydraulic bicycle brake cylinder comprising at least one actuating cylinder, at least one brake cylinder in a cylinder mounting, and a brake element operatively connected to the brak ecylinder, the brake cylinder being connected to the actuating cylinder by a fluid line, wherein the fluid line opens into a variable-volume chamber in the brake cylinder and the movement of the brake element is controllable by the variation of volume thereof, wherein the brake cylinder rests in a mounting eye of a rotatable mounting ring which is fixable in a preselectible position, including a holding body associated with a wheel of the bicycle, wherein the inside surface of an opening in the holding body is of a concave cross-section, to match it to the outside surface of the mounting ring.

11. A bicycle brake according to claim 10 wherein the holding body has a separation slit which extends from its opening.

12. A bicycle brake according to claim 11 wherein the separation slit is delineated by clamping jaws connected by a tightening element.

13. A bicycle brake according to claim 12 wherein the tightening element connects the holding body to the bicycle.

14. A bicycle brake according to claim 12 wherien at least one stop rib projects away from the holding body substantially parallel to the tightening element.

15. A bicycle brake according to claim 10 wherein the holding body is a disc-like configuration.

16. A bicycle brake according to claim 10 wherein at least one adjustable clamping member is inserted into the holding body substantially radially with respect to the opening thereof.

* * * * *